April 30, 1963 R. J. PURTELL 3,087,680
IRRIGATION PIPE MOVING SYSTEM
Filed Feb. 13, 1962 2 Sheets-Sheet 1
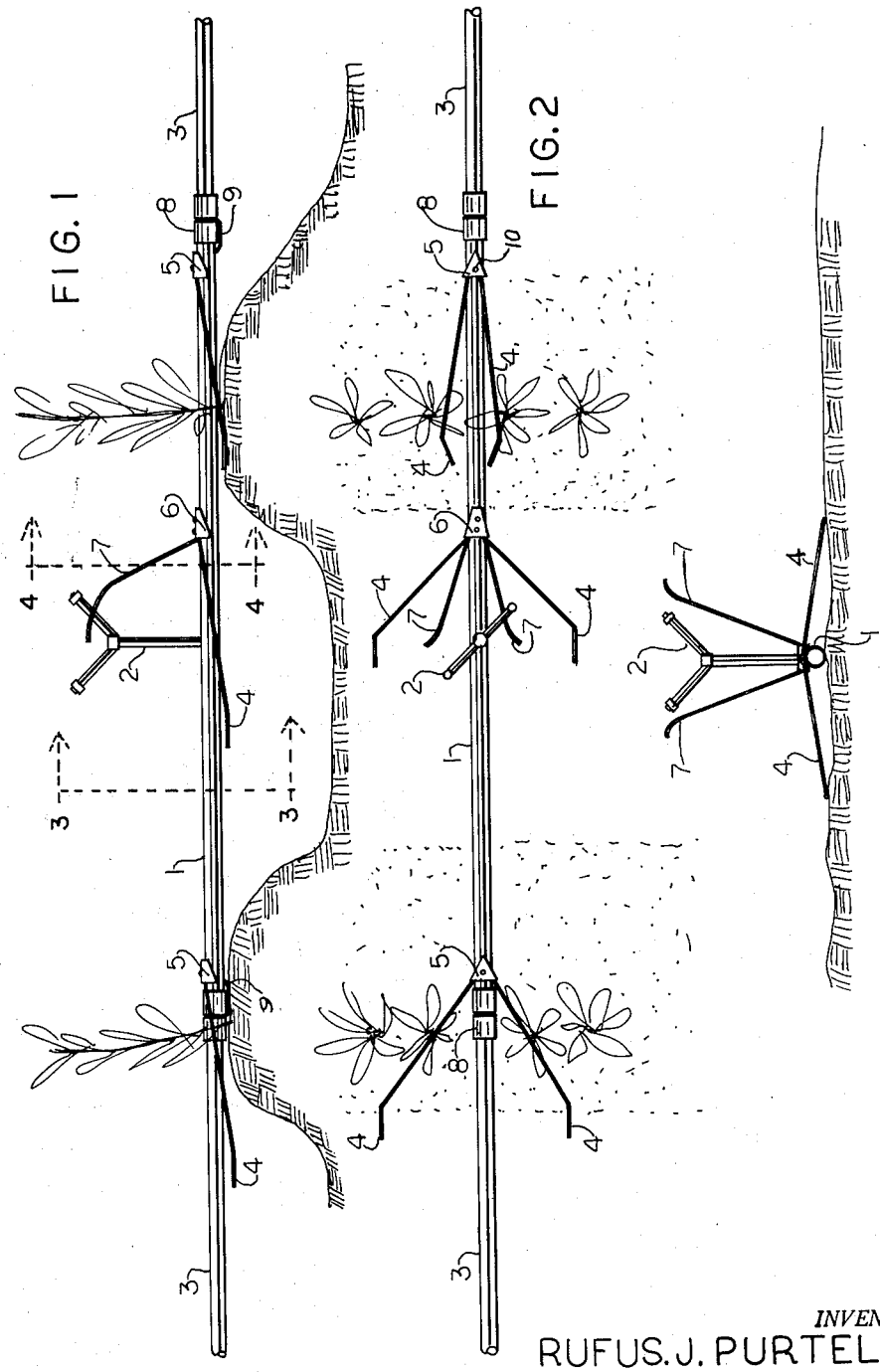
INVENTOR.
RUFUS. J. PURTELL
BY
Atty.

April 30, 1963 R. J. PURTELL 3,087,680
IRRIGATION PIPE MOVING SYSTEM
Filed Feb. 13, 1962 2 Sheets-Sheet 2
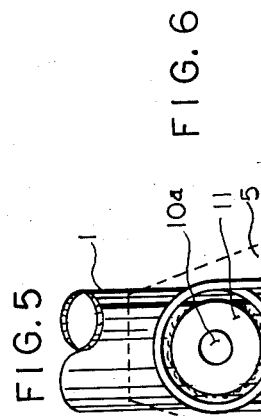
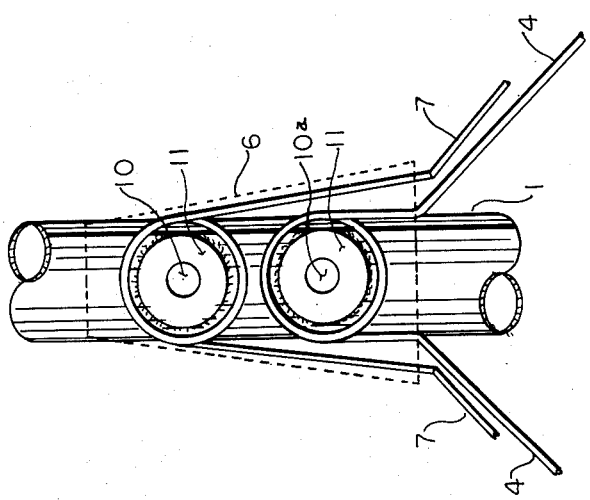
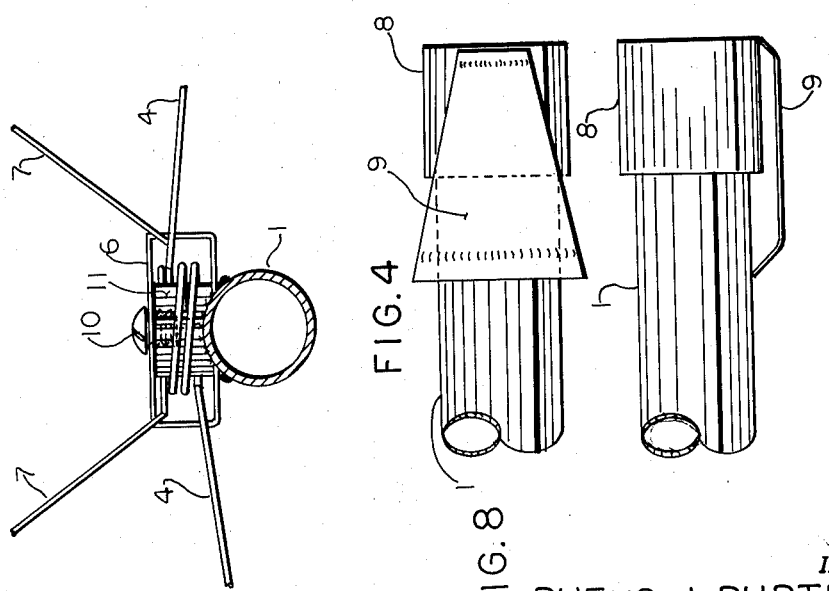
INVENTOR.
RUFUS. J. PURTELL
BY
Atty.

United States Patent Office 3,087,680
Patented Apr. 30, 1963

3,087,680
IRRIGATION PIPE MOVING SYSTEM
Rufus J. Purtell, Brownfield, Tex., assignor to Robert B. Knight, J. B. Knight, and Jean Knight Jones, doing business as J. B. Knight Company, Brownfield, Tex.
Filed Feb. 13, 1962, Ser. No. 172,997
6 Claims. (Cl. 239—213)

This invention pertains to irrigation systems and more particularly to a system whereby water is sprinkled from a pipe which is dragged axially through a field.

There are many patents disclosing systems for moving irrigation pipe through a field. One type of system contemplates that pipes with sprinklers attached thereto would be moved axially through the field. It is contemplated in such systems that the pipes would have outriggers or runners attached to them to keep them upright, thus making a section of the conduit a sled.

An object of this invention is to provide an improved means for keeping the pipe with the sprinklers erect while moving the pipe axially through the field.

Another object is to provide means for guarding the rotating sprinkler from being fouled by plant foliage.

Further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawings, the different views of which are not necessarily to the same scale, in which:

FIG. 1 is an elevational view of an embodiment of this invention.

FIG. 2 is a plan view of the embodiment.

FIG. 3 is an end sectional view of the device taken on line 3—3 of FIG. 1.

FIG. 4 is an enlarged sectional view as taken substantially on line 4—4 of FIG. 1.

FIG. 5 is an enlarged partial plan view of the device with the cover shown in dotted line for clarity.

FIG. 6 is an enlarged partial plan view of the device with the cover shown in dotted line for clarity.

FIG. 7 is an enlarged elevational view of a coupling shoe.

FIG. 8 is an enlarged bottom view of a coupling shoe.

Referring to FIG. 1, it will be seen that one embodiment of this invention would include rigid pipe 1 about 46 inches long. This rigid pipe 1 may be considered a sled. I choose this length because most crops are planted on 40 inch rows; therefore, the rigid section of pipe 1 should be longer than the width of rows so that it spans the rows. The rigid section carries thereon sprinklers 2 which are mounted on standards so that they extend upward from the pipe 1. Inasmuch as the sprinklers are standard and well-known to the art, they will not be further described here.

Coupling 8 is at each end of the rigid pipe 1 so that the pipe 1 may be coupled to flexible tubing 3, which is a source of water under pressure. The water will be discharged from the sprinkler 2 to irrigate the crop. It may be seen that the tubings 3 together with pipe 1 form a water carrying conduit. Inasmuch as the couplings 8 themselves are well-known to the art they will not be discussed further except to note that on the pipe 1 each coupling 8 has shoe 9. As will be more clearly seen in FIG. 8 the shoe 9 is wedge shaped in the direction which it would travel so that it is well adapted to slide along the ground.

Whisker or spring rod 4 is adjacent each coupling 8 to maintain the pipe 1 oriented in an upright position. The rod 4 is made from steel spring wire. The rod 4 extends outward and slightly downward so that the bottom of the trailing edge of the rod 4 is at the same elevation or slightly lower than the bottom of the pipe 1. The rod 4 extends outward from the pipe so that from the top it forms a V-shaped configuration (FIG. 2). Inasmuch as it is made of spring steel it is capable of folding inward as seen at the right in FIG. 2 in case the pipe 1 is pulled through obstructions. Inasmuch as the pipe 1 is considered a sled, it is as though the frame of the sled collapses when the rods 4 fold inward.

The rod or whisker 4 is attached to pipe 1 by means of post 11 which is attached at the top of the pipe 1. The rod 4 spirals around the post 11 so as it is capable of flexing. Cover 5 extends over the post 11 to prevent vegetation or other debris from gathering thereon. The rod 4 spirals around the post 11 in a helix which surrounds the post and is free to rotate and flex within the limits of the cover 5. The cover 5 is attached by screw 10 threaded into hole 10a in the top of post 11.

When the rod 4 flexes inward the movement is absorbed by the helix portion around post 11. When the rod 4 flexes upward, the movement is absorbed by the helix portion until the rod 4 contacts the cover 5. Further flexing is absorbed only in that portion beyond cover 5. Therefore, the rod 4 flexes more freely in a horizontal direction than in a vertical one.

There are two of these units with cover 5 and rod 4, one immediately behind forward coupling 8 and the other immediately before the rear coupling 8.

Immediately in front of sprinkler 2, which is located about the middle of the pipe 1 there is attached cover 6. Cover 6 covers two posts 11. The two posts are aligned along the pipe 1. The rear post 11 carries rod or whisker 4 which is identical to that described above.

The forward post 11 carries whisker or spring rod 7. This rod 7 also is spiralled helically around post 11 like rod 4 around its post 11. However, the rod 7 extends rearward and upward so that the terminal end of rod 7 is at about the same height as the top of the sprinkler 2. This rod prevents the top of the sprinkler 2 from being fouled by the vegetation. Viewed from the top the rod 7 also forms a V-shaped configuration. Cover 6 will limit vertical flexing in the same manner as cover 5.

It will be apparent that the embodiment shown is only exemplary and that various modifications can be made in construction, materials, and arrangement within the scope of the invention as defined in the appended claims.

I claim as my invention:

1. A means for keeping a pipe with sprinklers on it erect, comprising:
   (a) a post attached to the top of the pipe,
   (b) a spring rod spiralled helically around the post,
   (c) the ends of the rod extending downward and rearward,
   (d) in a V-shaped configuration on either side of the pipe, and
   (e) a cover over the post attached by a
   (f) screw threaded into the top of the post
   (g) the screw extending through a hole in the cover.

2. A collapsible irrigation sled unit comprising:
   (a) an elongated pipe,
   (b) couplings on each end of the pipe for attaching it within a water carrying conduit,
   (c) a sprinkler attached to the top of the pipe,
   (d) a plurality of V-shaped spring rods attached to the pipe,
   (e) the point of the V of each rod at the pipe and the ends of each rod extending to either side of the pipe,
   (f) the ends of some of the rods extending to the same level as the bottom of the pipe, and
   (g) the ends of at least one of the rods extending upward to either side of the sprinkler.

3. A collapsible irrigation sled unit comprising:
 (a) an elongated pipe,
 (b) couplings on each end of the pipe for attaching it within a water carrying conduit,
 (c) a sprinkler attached to the top of the pipe,
 (d) a plurality of posts attached to the top of the pipe, and
 (e) a spring rod spiralled helically around each post,
 (f) the ends of each rod extending in a V-shaped configuration to either side of the pipe,
 (g) the ends of some of the rods extending downward to the same level as the bottom of the pipe, and
 (h) the ends of at least one of the rods extending upward to either side of the sprinkler.

4. A collapsible irrigation sled unit comprising:
 (a) an elongated rigid pipe,
 (b) a coupling on at least one end of the pipe for attaching it to a source of water under pressure,
 (c) a plurality of posts attached to the top of the pipe,
 (d) a spring rod spiralled helically around each post,
 (e) the ends of each rod extending in a V-shaped configuration on either side of the pipe,
 (f) the ends of some of the rods extending downward to the same level as the bottom of the pipe, and
 (g) a cover means over each post attached thereto for limiting the vertical movement of the rods.

5. A collapsible irrigation sled unit comprising:
 (a) a horizontal elongated pipe,
 (b) a coupling on at least one end of the pipe for attaching the pipe to a source of water under pressure,
 (c) at least one V-shaped spring rod,
 (d) the point of the V of the spring rod on the pipe,
 (e) the two ends of the spring rod extending downward and rearward to either side of the pipe, and
 (f) means for attaching the spring rod to the pipe at the point of the V so that the spring rod collapses inward toward the pipe when the unit is pulled through obstructions.

6. A collapsible irrigation sled unit comprising:
 (a) a horizontal elongated pipe,
 (b) least one sprinkler on the pipe for sprinkling water therefrom,
 (c) a coupling on at least one end of the pipe for attaching the pipe to a source of water under pressure,
 (d) at least one V-shaped spring rod,
 (e) the point of the V of the spring rod on the pipe,
 (f) the two ends of the spring rod extending downward and rearward to either side of the pipe, and
 (g) means for attaching the spring rod to the pipe so that the ends of the spring rod are flexible in a horizontal direction and rigid in a vertical direction.

References Cited in the file of this patent

UNITED STATES PATENTS

| | | |
|---|---|---|
| 581,874 | White | May 4, 1897 |
| 619,189 | Kitzing | Feb. 7, 1899 |
| 902,863 | Darrow | Nov. 3, 1908 |
| 2,741,509 | Melcher | Apr. 10, 1956 |
| 2,892,466 | Stillwell et al. | June 30, 1959 |
| 2,990,121 | Fischer | June 27, 1961 |